US011414939B2

(12) United States Patent
Masini et al.

(10) Patent No.: US 11,414,939 B2
(45) Date of Patent: Aug. 16, 2022

(54) WASHPIPE SYSTEM

(71) Applicant: Deublin Company, LLC, Waukegan, IL (US)

(72) Inventors: Paul Mario Masini, Mount Prospect, IL (US); Mark Gerard Pospisil, Park Ridge, IL (US)

(73) Assignee: Deublin Company, LLC, Waukegan, IL (US)

( * ) Notice: Subject to any disclaimer, the term of this patent is extended or adjusted under 35 U.S.C. 154(b) by 105 days.

(21) Appl. No.: 17/015,716

(22) Filed: Sep. 9, 2020

(65) Prior Publication Data

US 2021/0071487 A1 Mar. 11, 2021

Related U.S. Application Data

(60) Provisional application No. 62/898,223, filed on Sep. 10, 2019.

(51) Int. Cl.
*E21B 21/01* (2006.01)
*F16L 27/08* (2006.01)

(52) U.S. Cl.
CPC .......... *E21B 21/01* (2013.01); *F16L 27/0808* (2013.01)

(58) Field of Classification Search
CPC ..... F16L 27/0808; F16L 27/082; E21B 21/01; E21B 21/02
See application file for complete search history.

(56) References Cited

U.S. PATENT DOCUMENTS

| | | | |
|---|---|---|---|
| 6,007,105 A | 12/1999 | Dietle et al. | |
| 6,467,557 B1 * | 10/2002 | Krueger | E21B 4/18 |
| | | | 175/45 |
| 6,554,016 B2 * | 4/2003 | Kinder | E21B 33/085 |
| | | | 277/927 |
| 7,343,968 B2 | 3/2008 | Kubala | |
| 7,487,848 B2 | 2/2009 | Wells et al. | |
| 7,789,161 B2 | 9/2010 | Riley et al. | |
| 9,540,898 B2 | 1/2017 | Hughes | |
| 10,538,978 B1 | 1/2020 | Du | |
| 2008/0017814 A1 * | 1/2008 | Berckenhoff | F16J 15/164 |
| | | | 251/1.3 |
| 2008/0309013 A1 * | 12/2008 | Taheri Oskouei | F16J 15/3472 |
| | | | 277/307 |
| 2017/0298702 A1 | 10/2017 | Glawion et al. | |
| 2018/0355975 A1 | 12/2018 | Petrou | |
| 2019/0107236 A1 * | 4/2019 | Petrou | F16L 39/06 |

FOREIGN PATENT DOCUMENTS

CN 110608002 A 12/2019
WO WO 2015/022667 A2 2/2015

* cited by examiner

*Primary Examiner* — D. Andrews
*Assistant Examiner* — Ronald R Runyan
(74) *Attorney, Agent, or Firm* — Leydig, Voit & Mayer, Ltd.

(57) ABSTRACT

A washpipe seal and method includes providing a first sliding mechanical face seal between two seal elements to seal a mud conduit, and a second mechanical face seal between two additional seal elements to define a cavity within a housing of the washpipe between the first and second mechanical face seals and independently from the mud conduit, and in which, during operation, a buffer fluid can be provided.

12 Claims, 7 Drawing Sheets

WASHPIPE SYSTEM

CROSS-REFERENCE TO RELATED APPLICATIONS

This patent application claims the benefit of U.S. Provisional Patent Application No. 62/898,223, filed Sep. 10, 2019, which is incorporated by reference.

FIELD OF THE DISCLOSURE

The present disclosure is applicable to wellbore drilling top drive systems and, more particularly, to a washpipe system and method for sealing a rotatable interface along a drilling fluid conduit.

BACKGROUND OF THE INVENTION

Wellbore drilling applications typically use a downhole drilling apparatus or drilling swivel disposed on an end of a drill string that extends to the surface. At the surface, a top end of the drill string is engaged and rotated by a top drive. The drill string is typically hollow such that a drilling fluid, such as mud, or concrete for stabilizing the drill bore, can be supplied from the surface to the drilling apparatus or onto the sides of the bore. Drilling fluid is transmitted to the drilling swivel and through a high-pressure swivel apparatus known as a "washpipe" with a seal typically known as a "washpipe packing" assembly. This packing assembly may typically include a tubular component which is held stationary, and through which the drilling fluid flows under high pressure. A rotating seal assembly of contact lip seals is mechanically fixed to and rotates with the main shaft of the top drive or swivel, and forms a dynamic seal against the outer surface of the tubular washpipe as the main shaft rotates while drilling.

Many different factors can affect the quality and lift of the seal provided by a traditional washpipe packing assembly. For example, the drilling fluid is usually provided at high pressures, for example, 6 or 7 kpsi. Moreover, the drilling fluid often contains aggregates that can corrode and/or physically wear the seal interface. Also, high drilling speeds create friction and heat, which can accelerate seal degradation. When the washpipe seals become compromised, drilling fluid leaks, which are common on many drilling rigs, can contaminate or damage surrounding components and the environment.

In top drives and rotary drilling, the washpipe typically sealingly engages a set of circumferential seals contained within a seal housing. Often, the washpipe remains stationary while the seals and the seal housing rotate. Such seal assemblies have conventionally included a series of reinforced, elastomeric, chevron-type seals interspersed with a series of reinforcing back-up rings. In certain prior art systems, one seal is exposed to full hydraulic pressure on one side, and atmospheric pressure on the opposite side. Full differential pressure of the drilling mud acts on one seal until that seal fails and the next seal in the assembly then acts as the primary seal. Some prior art swivel designs have sought to compensate for potential run-out and offset problems by allowing the washpipe and the seal housing to articulate.

BRIEF SUMMARY OF THE INVENTION

In one aspect, the disclosure describes a washpipe seal arrangement disposed between a non-rotating machine component and a rotating machine component along a fluid conduit extending across the rotating and non-rotating machine components. The washpipe seal arrangement includes a non-rotating frame connected to the non-rotating machine component. The non-rotating frame includes a non-rotating seal carrier, which has a generally hollow cylindrical shape that forms an internal cavity. A first non-rotating seal is connected to the non-rotating seal carrier, and a second non-rotating seal is connected to the non-rotating seal carrier. The first and second non-rotating seals are disposed in the internal cavity and in spaced relation relative to one another. A rotatable seal carrier is rotatably disposed at least partially within the internal cavity. The first rotating seal is connected to the rotatable seal carrier and disposed adjacent the first non-rotating seal, and a second rotating seal is connected to the rotatable seal carrier and disposed adjacent the second non-rotating seal. During operation, the first rotating seal contacts the first non-rotating seal to define a first sliding mechanical seal configured to seal the fluid conduit, and the second rotating seal contacts the second non-rotating seal to define a second sliding mechanical face seal configured to seal a first portion of the internal cavity that is separate from the fluid conduit and extends to the first sliding mechanical seal.

In another aspect, the disclosure describes a washpipe seal arrangement for use with a mud conduit in a drilling operation. The mud conduit may extend between a topdrive and a drill string. The washpipe seal arrangement includes a non-rotating frame connected to a non-rotating machine component of the topdrive, the non-rotating frame including a non-rotating seal carrier having a generally hollow cylindrical shape that forms an internal cavity. A first non-rotating seal is connected to the non-rotating seal carrier, and a second non-rotating seal is connected to the non-rotating seal carrier. The first and second non-rotating seals are disposed in the internal cavity and in spaced relation to one another. A rotatable seal carrier is rotatably disposed at least partially within the internal cavity. A first rotating seal is connected to the rotatable seal carrier and disposed adjacent the first non-rotating seal, and a second rotating seal is connected to the rotatable seal carrier and disposed adjacent the second non-rotating seal.

During operation, the first rotating seal contacts the first non-rotating seal to define a first sliding mechanical seal configured to seal the mud conduit, and the second rotating seal contacts the second non-rotating seal to define a second sliding mechanical face seal configured to seal a first portion of the internal cavity that is separate from the mud conduit and extends to the first sliding mechanical seal. A buffer fluid is provided at a pressure that is at least equal or higher than a pressure of mud in the mud conduit. The buffer fluid is provided in the first portion of the internal cavity.

In yet another aspect, the disclosure describes a method for operating a washpipe seal arrangement. The method includes providing at least one non-rotating seal carrier disposed at least partially around a mud conduit, wherein the mud conduit extends across rotating and non-rotating machine components, and wherein the washpipe seal arrangement forms at least a segment of the mud conduit. The method further includes creating a first sliding mechanical face seal between two seal elements included in the washpipe seal arrangement, the first sliding mechanical face seal being disposed at an interface between the rotating and non-rotating machine components. The method also includes creating a second mechanical face seal between two additional seal elements included in the washpipe seal arrangement, and defining a cavity within a housing of the washpipe seal arrangement between the first and second mechanical face seals and independent from the mud conduit. In accordance with the method, a buffer fluid is provided in the cavity during operation.

BRIEF DESCRIPTION OF THE SEVERAL VIEWS OF THE DRAWING(S)

DETAILED DESCRIPTION OF THE INVENTION

The present disclosure relates to washpipe seal arrangements for drilling operations and, more particularly, to a washpipe seal arrangement that includes a dual-sealing interface that is buffered by a lubricant such that sealing is improved and service life of the seal is extended over known designs. To put the disclosure into context, a drilling system 100 is shown in FIG. 1 as an exemplary application of the presently disclosed system and method.

Figure 1:
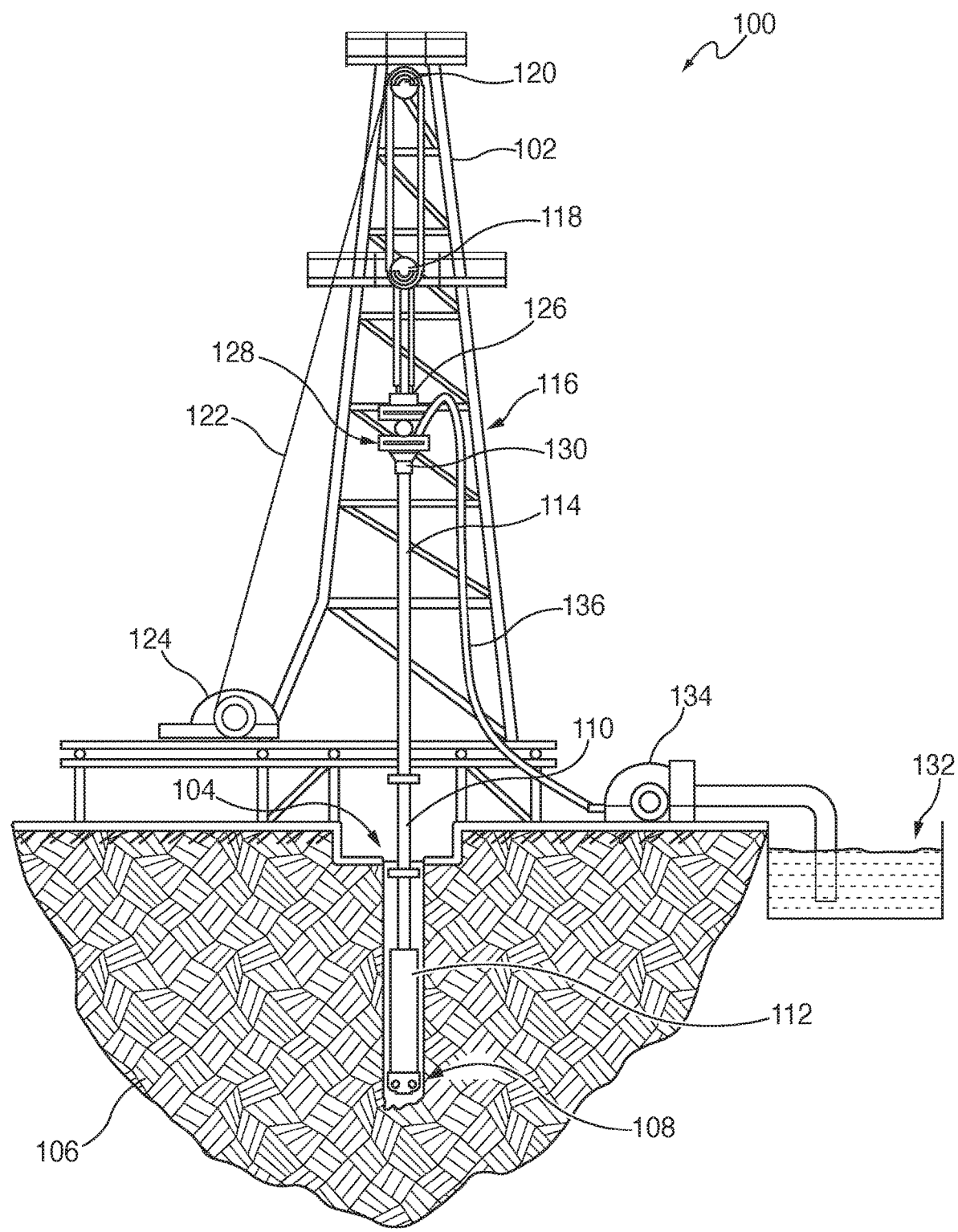
FIG. 1 is a schematic view of an exemplary drilling system in accordance with the disclosure.

The drilling system 100 shown in FIG. 1 includes a support tower or derrick 102 that supports a variety of drilling equipment operating to drill a borehole 104 into the ground 106 by use of a drill bit 108 disposed at an end of a drill string 110. In the illustrated embodiment, the drill bit 108 is powered by a turbine 112 disposed at the end of the drill string 110 adjacent the drill bit 108. In the typical fashion, mud or another liquid or agglomerate fluid is provided through the hollow drill string 110 under pressure to operate the turbine 112. Fluid exhausted by the turbine 112 during operation carries drilling debris back through the borehole 104 to the surface.

The drill string 110 is pushed downwardly and may also be caused to rotate by engagement with a splined section or Kelly 114, which is rotatably engaged by a top drive 116. The top drive is a driver that travels vertically along the height of the derrick 102 to add or remove pipe sections from the drill string, and that also powers rotation of the Kelly 114 and provides the mud through the drill string to operate the turbine 112. The top drive 116 can be raised or lowered using a system of pulleys, as shown a travelling block 118 and a crown block 120 that are connected by a cable 122 operated by a winch or draw works 124. The selective release or retraction of the cable 122 raises and lowers the top drive 116 while the drill string is advanced into the borehole 104. The top drive 116 includes a driving mechanism 126 to power the drill string 110 and also a fluid conduit 128 which provides mud through the drill string 110. A washpipe seal arrangement 130 is used to provide a seal against the leakage of mud between rotating portions of an end of the drill string and a stationary part of the driving mechanism of the drill string on the top drive. As shown, the mud may be provided from a reservoir 132, whereby a pump 134 draws mud and provides it to the top drive 116 through a hose 136, which is connected between the top drive 116 and the pump 134 and follows the vertical travel of the top drive during operation.

Figure 2:
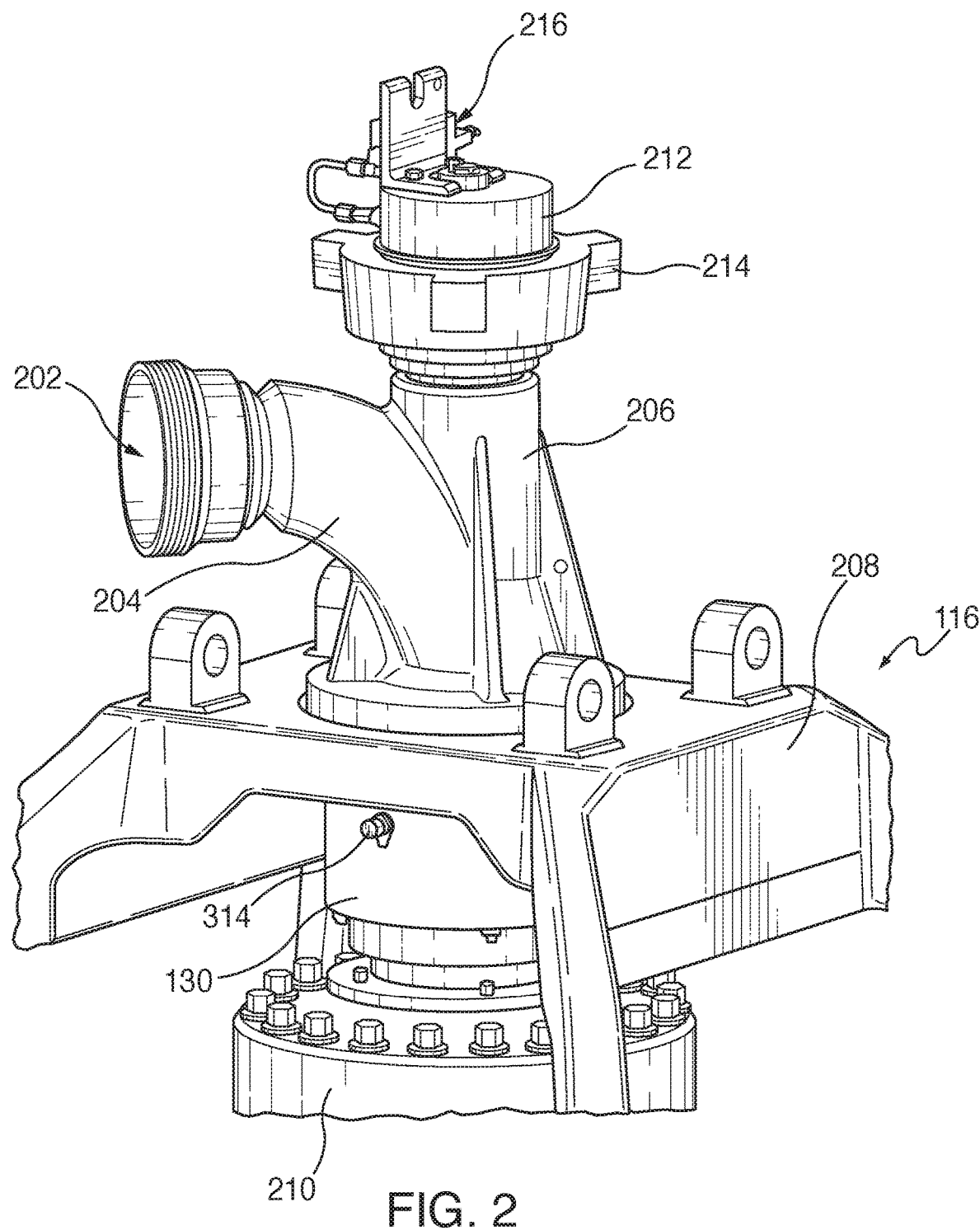
FIG. 2 is a partial, closeup view of a washpipe assembly embodied as a rotary union in its installed condition in a drilling system in accordance with the disclosure.

An enlarged, partial view of a portion of the top drive 116 is shown in FIG. 2 removed from the drilling system 100 for illustration. In this view, a mud inlet or gooseneck opening 202 is shown, through which mud is provided to the top drive to be routed under pressure into the drill string 110 (FIG. 1). The opening 202 is formed at the end of a fluid conduit 204 that is integrated with an intensifier housing 206. Fluid is supplied through a washpipe seal 130 that is disposed between stationary component such as a top drive frame 208 and a rotatable drive 210, which engages and rotates the drill string 110. The intensifier housing 206, which is shown sectioned and described in further detail relative to FIG. 6, includes a piston housing 212 that is attached to the intensifier housing 206 by a threaded nut 214. Associated with the piston housing 212 is a fluid block 216, which will be described in further detail relative to FIG. 6.

Figure 3:
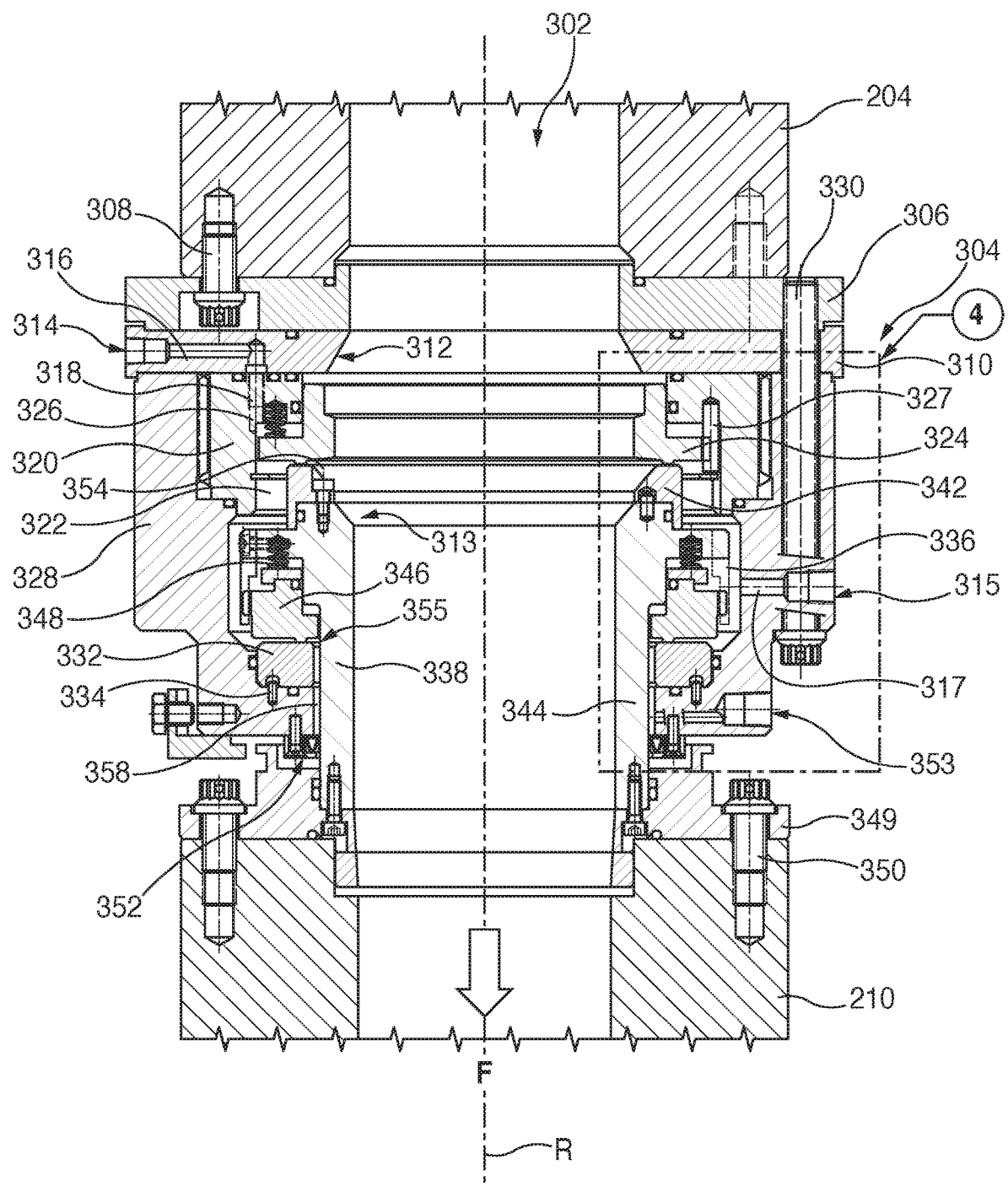
FIG. 3 is a section view of a washpipe assembly in accordance with the disclosure.
Figure 4:
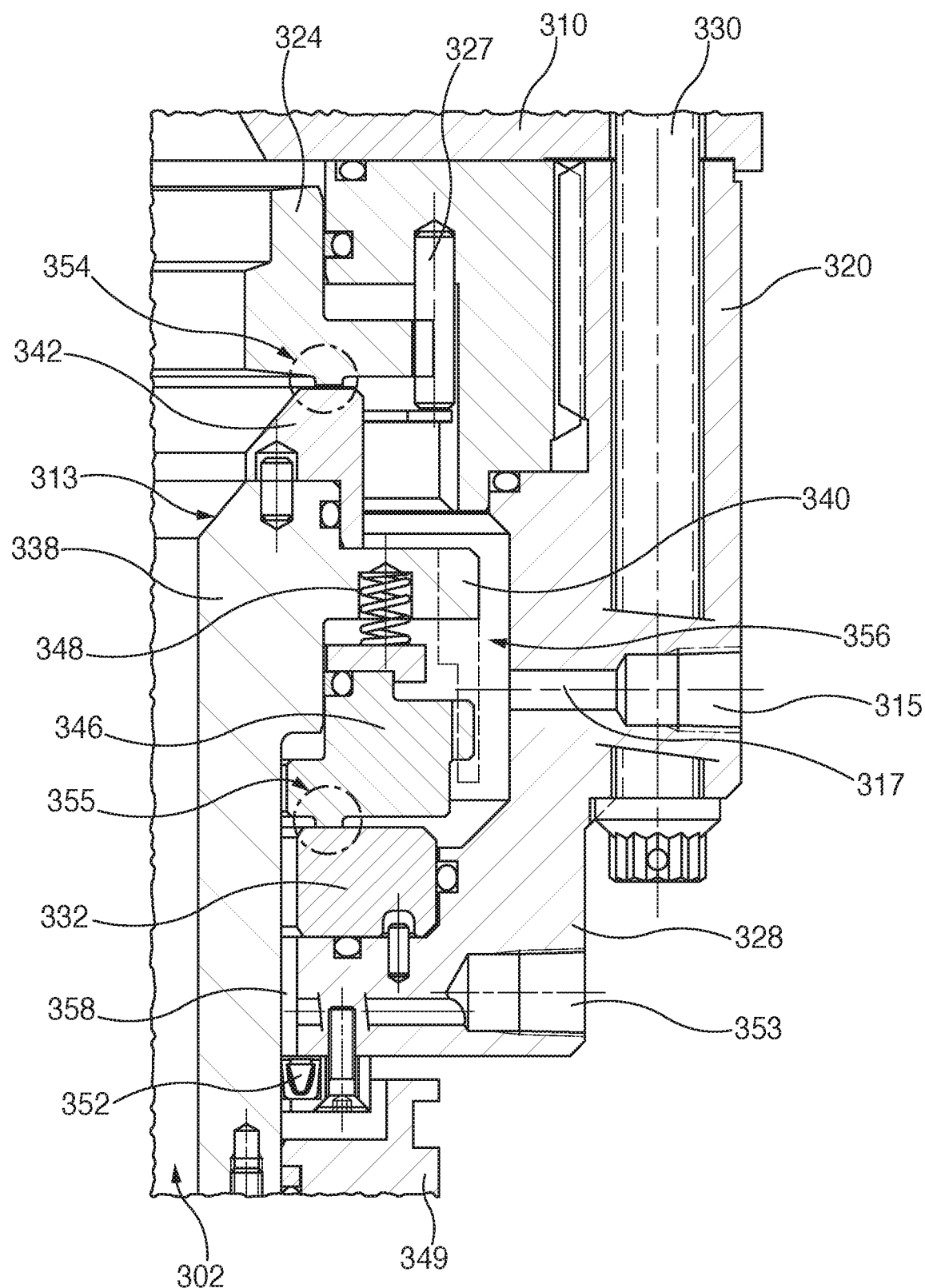
FIG. 4 is an enlarged detail view of a portion of FIG. 3.

A cross section through the washpipe seal arrangement 130 is shown in FIG. 3, and an enlarged detail is shown in FIG. 4. In reference to these figures, as shown, the washpipe seal arrangement 130 is an assembly of components disposed between the stationary fluid conduit 204 that is part of the top drive 116, and the rotatable drive 210, which is rotatably engaged with the rotating drill string 110. The washpipe seal arrangement 130 therefore includes portions configured to rotate relative to one another while providing a seal along a mud conduit 302 extending through the top drive, the washpipe and the drill string.

More specifically, the washpipe seal arrangement 130 includes a non-rotating frame 304 connected to the fluid conduit 204. The non-rotating frame 304 includes a mounting plate 306 connected to an end of the fluid conduit 204 with fasteners 308 along a sealed interface. An expander plate 310 is connected to the mounting plate 306 along a sealed interface. The expander plate 310 includes a diverging opening that forms a conical surface 312, which increases a flow area for the mud passing through the mud conduit 302 in the direction denoted by arrow F. The expander plate 310 further includes a buffer fluid inlet 314 that is fluidly connected to a buffer fluid passage 316 extending radially through at least a portion of the expander plate 310 and fluidly connecting the buffer fluid inlet 314 with a transfer passage 318 formed in a first non-rotating seal carrier 320.

The first non-rotating seal carrier 320 has a generally hollow cylindrical shape and is disposed in contact with the expander plate 310, opposite the mounting plate 306, such that an internal cavity or bore 322 of the first non-rotating seal carrier 320 is in fluid communication with an internal end or opening of the transfer passage 318 and the buffer fluid inlet 314. The first non-rotating seal carrier 320 slidably and non-rotatably supports a first non-rotating seal 324. The first non-rotating seal 324 is biased by a spring 326 in a direction away from the expander plate 310 (in a downward direction, in the orientation shown in FIG. 3). The spring 326 is disposed between a portion of the first non-rotating seal carrier 320 and the first non-rotating seal 324. A pin 327 extending through aligned features in the first non-rotating seal carrier 320 and the first non-rotating seal 324 axially and slidably engages the two components while also preventing their relative rotation.

A second non-rotating seal carrier 328, which may be a separate component or, as is shown in the illustrated embodiment, integrated with the first non-rotating seal carrier 320 into a single component, is sealably connected to or integrated with the first non-rotating seal carrier 320 opposite the expander plate 310 by use of one or more elongate fasteners 330. The second non-rotating seal carrier 328 includes a second non-rotating seal 332 connected thereon and rotatably engaged therewith by pins 334. The second non-rotating seal carrier 328 also has a hollow cylindrical shape forming a bore 336 that is generally aligned and fluidly combinable or connectable with the bore 322 of the first non-rotating seal carrier 320. The bore 336 formed in the second non-rotating seal carrier 328 includes the second non-rotating seal 332. In this way, the first and second non-rotating seals 324 and 332 are disposed within the combined bores 322 and 336 in opposed relation, although it should be appreciated that the orientation of the springs biasing the seals, and also the seals themselves, can be reversed. The second non-rotating seal carrier 328 further includes an additional buffer fluid inlet 315 that is fluidly connected to a buffer fluid passage 317 extending radially through at least a portion of the second non-rotating seal carrier 328 and fluidly connecting the additional buffer fluid inlet 315 with the interior of bore 336.

A rotating seal carrier 338 having a hollow tubular shape includes a central channel that defines a segment of the mud conduit 302 that is surrounded by a generally cylindrical wall. The rotating seal carrier 338 is rotatably disposed within the combined bores 322 and 336. The wall includes a flange 340 (shown in the enlarged view of FIG. 4), which extends in radially outward direction relative to a rotational axis, R, which axis extends through the mud conduit 302. The flange 340 is entirely disposed in both a radial and axial direction relative to the axis R within the combined bore 322/326. A first rotating seal 342 is connected to the rotating seal carrier 338 on one side of the flange 340 in an axial direction along the axis, R. In the illustrated embodiment, the first rotating seal 342 is sized to fit at one end of the cylindrical wall 344 and is disposed inwardly in a radial direction relative to the flange 340. The wall 344 adjacent the first rotating seal 342 includes a converging opening that forms a conical surface 313, which decreases a flow area for the mud passing through the mud conduit 302 in the direction denoted by the arrow, F.

A second rotating seal 346 is slidably connected to the rotating seal carrier 338 and disposed on an opposite side of the flange 340 from the first rotating seal 342 relative to the axial direction along the R axis. One or more springs 348 bias the second rotating seal 346 away from the flange, and also the first rotating seal 342, for example, in the downward direction in the orientation shown in FIG. 3, but the orientation or the seal the springs are acting on can also be reversed, or springs can be applied to both rotating seals. On an end opposite the flange 340, the rotating seal carrier is connected and sealably engaged to the rotatable drive 210 through a mounting collar 349, which is in turn fastened to the rotatable drive 210 by use of fasteners 350. A secondary seal 352, which in the illustrated embodiment is structured as a pressure seal containing a U-cup cross section that opens in a direction towards the first non-rotating seal carrier 320 is sealably disposed or engaged between an outer surface of the rotating seal carrier 338 and an inner surface of the bore 336 formed in the second non-rotating seal carrier 328. A drain port 353 extends through the second non-rotating seal carrier 328 and is fluidly connected to the bore 336 in an area adjacent the secondary seal 325 and between the secondary seal 325 and the second non-rotating seal 332.

During operation, the washpipe seal arrangement 130 is configured to and operates to provide a sliding seal function around the mud conduit 302 to prevent leakage of mud or, in general, a fluid or liquid containing an aggregate, over a sliding interface disposed along the mud conduit 302 between rotating and non-rotating structures containing different segments of the mud conduit 302.

In the illustrated embodiment, the washpipe seal arrangement 130 includes a first sliding or mechanical face seal 354 that is formed by a circular, sliding contact area or interface between the first non-rotating seal 324 and the first rotating seal 342. The first mechanical face seal 354 is disposed along the mud conduit 302 and provides a sealing function to contain any fluids passing through the mud conduit 302 from leaking or escaping from the mud conduit into a cavity 356 (FIG. 4) defined within the bores 322 and 336. A second sliding mechanical face seal 355 is formed by a circular, sliding contact area or interface between the second non-rotating seal 332 and the second rotating seal 346. The cavity 356 defined within the bores 322 and 336 is thus generally sealed and exists at least partially within the bores 322 and 336 between the first mechanical face seal 354, and the second mechanical face seal 355. The cavity 356 is fluidly accessible externally through both the buffer fluid inlet 314 and the additional buffer fluid inlet 315. A second cavity 358 is also defined at least partially within the bore(s) 322 and/or 336, and extends between the second mechanical face seal 355 and the secondary seal 352. The second cavity 358 is accessible externally through the drain port 353.

During operation, a continuous flow of mud or another fluid is provided at a pressure, P1, through the mud conduit 302 while the rotating seal carrier 338 is rotating with respect to the first and second (or combined) non-rotating seal carriers 320 and 328. The mud flowing through the mud conduit 302 passes over the converging conical surface 313 and accelerates, thus reducing its dynamic pressure at it passes over the first mechanical face seal 354. A buffer fluid such as hydraulic oil is provided through the buffer fluid inlet 314 or 315 and occupies the first chamber 356. The buffer fluid is provided at a pressure P2, which is at least equal to or, preferably, higher than the pressure P1 of the mud such that P1≤P2. In this way, the first mechanical face seal 354 is exposed to either no pressure difference or, preferably, to a pressure difference tending to cause a transition of buffer fluid towards and into the mud conduit 302. Given the abrasive nature of the mud, ingress of buffer fluid into the mechanical face seal interface acts to both lubricate and cool the sliding and contacting portions of the first non-rotating and rotating seals 324 and 342.

The buffer fluid is maintained at the pressure P2 within the first cavity by the first mechanical face seal 354 and also by the second mechanical face seal 355. The second mechanical face seal 355 is exposed to the pressure P2 at one side, and to a lower or atmospheric pressure P3, such that P3<P2. The pressure P3 is present on the side of the seal that is open to the second cavity 358. Buffer fluid or hydraulic oil may be sealed or may alternatively be allowed to leak at a controlled rate past the second mechanical face seal 355 into the second cavity 358. Buffer fluid present in the second cavity 358 is collected by the secondary seal 352 and may be removed through the drain opening 353. The rate at which buffer fluid is allowed or designed to leak through the second mechanical face seal 355 may be selected based on the amount of heat the buffer fluid has absorbed from the first mechanical face seal 354 and, thus, a desired resulting or steady-state temperature of buffer fluid in the first chamber 356 can be achieved. Buffer fluid that is allowed to pass into the second chamber 358 is replenished in the first chamber 356 by a supply of fluid such that the first chamber 356 is filled with fluid for a service interval, for example, an 8-hour shift. Longer periods may also be used by increasing the size of a buffer fluid reservoir providing the buffer fluid to the first chamber 356.

Figure 5:
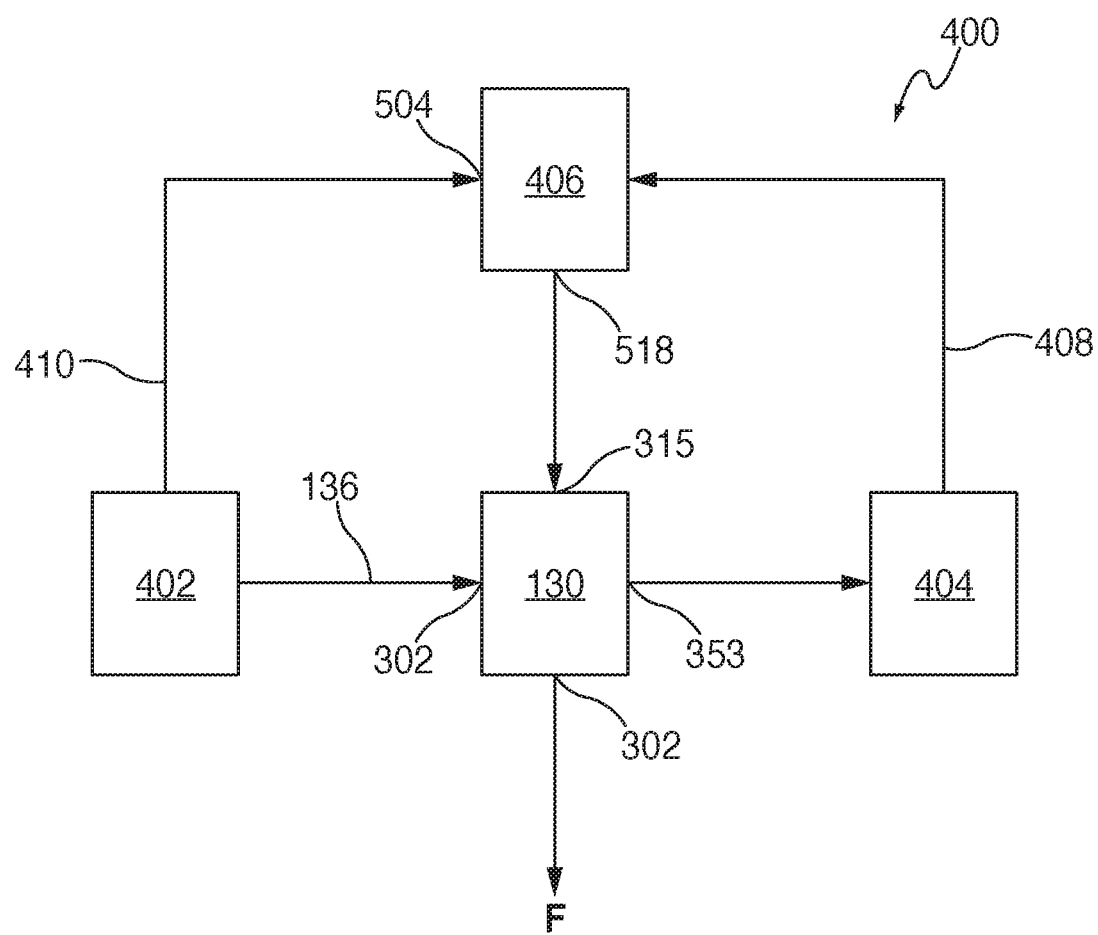
FIG. 5 is a schematic fluid diagram in accordance with the disclosure.

A schematic diagram of various fluid components associated with the washpipe seal 130 is shown in FIG. 5, where elements previously described are denoted by the same reference numbers previously used for sake of discussion. In this diagram, a fluid supply system 400 includes a mud supply 402, which provides a flow of mud to the mud conduit 302, for example, through the hose 136 (FIG. 1). The system 400 also includes a buffer fluid supply 404, which can include a reservoir that contains the buffer fluid, for example, hydraulic oil. The buffer fluid supply 404 provides buffer fluid at a low pressure, for example, the pressure P3, to a pressure regulator or intensifier 406 through a feed conduit 408. Similarly, the mud supply 402 provides mud or at least fluid at the mud supply pressure P1 through a generally static pressure conduit 410 to the intensifier 406. The intensifier 406 operates to automatically regulate or intensify the buffer fluid pressure P3 to the buffer fluid pressure P2 using the mud pressure P1 during operation such that fluctuations in the mud pressure P1 are accounted for by corresponding fluctuations in the buffer fluid pressure P2 to always maintain the relation P1≤P2 for the reasons discussed above.

Figure 6:
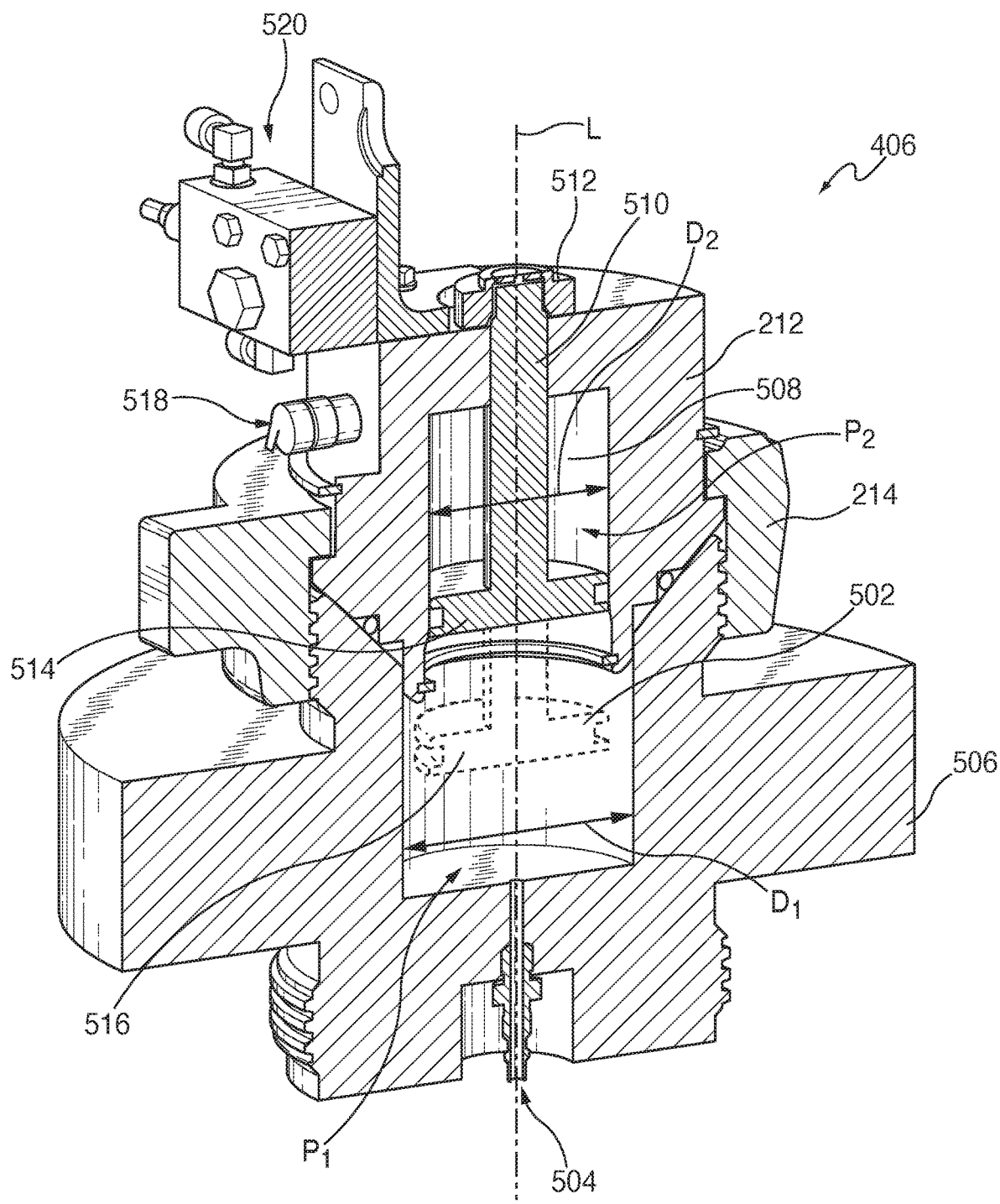
FIG. 6 is a section view of an intensifier for use with a washpipe assembly in accordance with the disclosure.

One possible and exemplary embodiment for an intensifier 406 is shown in cross section in FIG. 6. The intensifier 406 includes a mud piston chamber 502 having a first diameter, D1. The mud piston chamber 502 is fluidly connected to a mud inlet port 504 that is open to, and fluidly communicates with, the mud flow F provided to the mud conduit 302 (FIG. 3) such that fluids in the mud piston chamber 502 are present at the pressure P1 of the mud fluid supply passing through the mud conduit 302. The mud piston chamber 502 is formed in a bottom fitting 506, which is shown connected to the intensifier housing 206 in FIG. 2.

The piston housing 212 forms a buffer fluid piston chamber 508 having a diameter D2, which is smaller than D1 such that D2<D1. The chambers 502 and 508 are aligned along their centerlines and are open to each other to form a stepped chamber having a centerline, L. A stem 510 is slidably and sealably disposed at a bushing 512 to extend into the chambers 502 and 508 along the centerline L. Depending on whether an intensification is desired (P2>P1), or simply a tracking of the pressure (P1=P2) is desired, the stem 510 can include a single plunger 514 or two plungers, i.e., the plunger 514 and an additional plunger 516, which is denoted using dashed lines. When the single plunger 514 is used, pressure P1 from the chamber 502 acts on one side of the plunger 514 such that the fluid pressure P1 causes the presence of an equal pressure P2 in buffer fluid present in the chamber 508 (P2=P1). When an intensification is desired, the pressure P1 acts on one side of the additional plunger 516 at the larger diameter, D2, such that an intensification by a factor that depends on the ratio of the areas resulting from D2 and D1 is caused when the first plunger 514 acts on buffer fluid present in the chamber 508. Intensified buffer fluid is provided by a port 518. A valve system 520 replenishes buffer fluid within the chamber 508.

Figure 7:
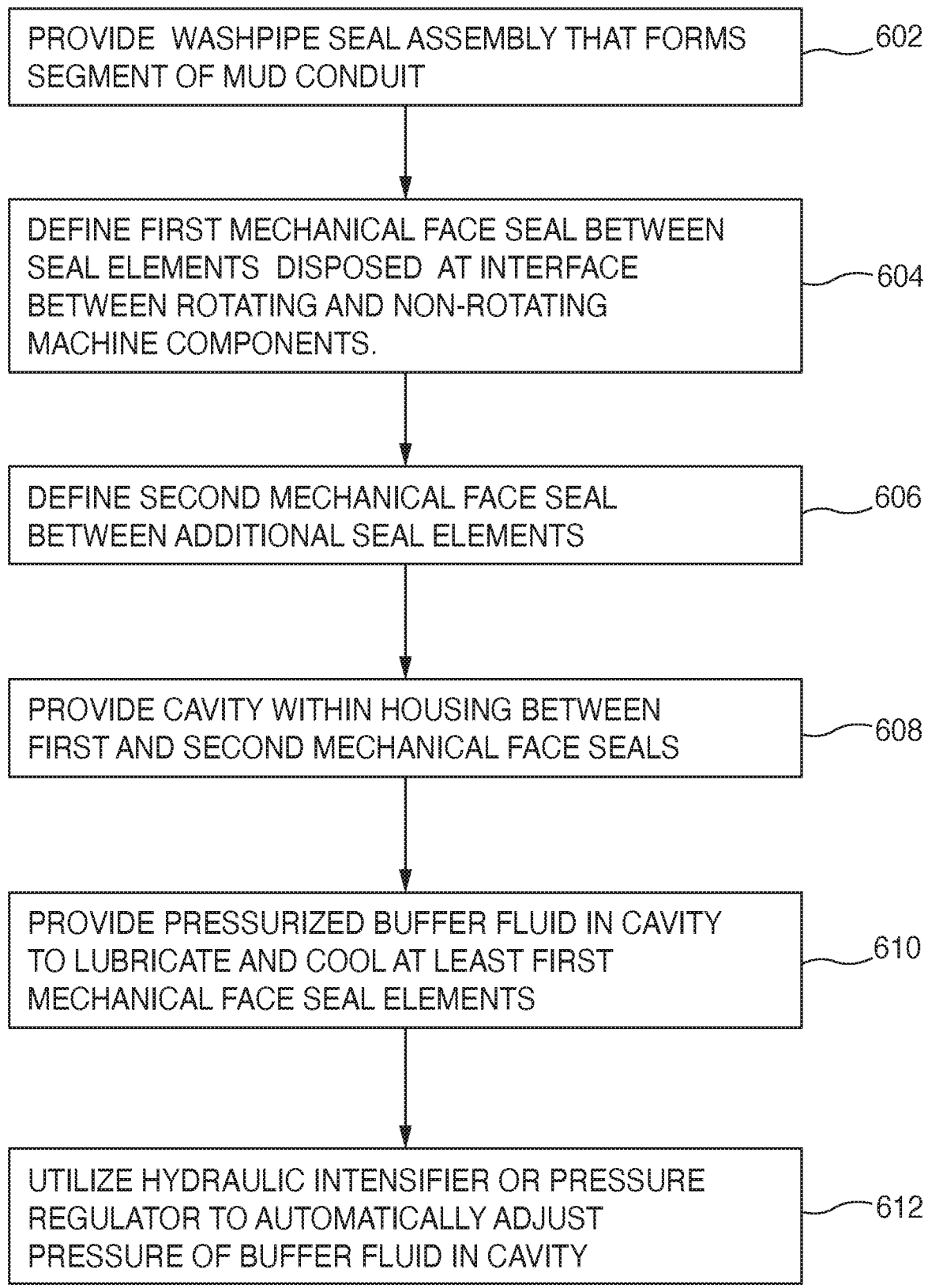
FIG. 7 is a flow chart for a method of operating a washpipe assembly in accordance with the disclosure.

A flowchart for a method of operating a washpipe seal assembly is shown in FIG. 7. In accordance with the method, at least one non-rotating seal carrier is disposed at least partially around a mud conduit, which may be provided as part of a drilling device. The mud conduit extends across rotating and non-rotating machine components. The washpipe seal assembly may form at least a segment of the mud conduit at 602 and includes a first sliding mechanical face seal defined between two seal elements and disposed at an interface between the rotating and non-rotating machine components at 604. The washpipe seal assembly may further include a second mechanical face seal formed between two additional seal elements at 606, and defining a cavity within a housing between the first and second mechanical face seals at 608. To discourage leakage of fluids from the mud conduit across the first mechanical face seal, a pressurized buffer fluid may be provided in the cavity at 610. Optionally, the buffer fluid may be provided at a pressure that is at least equal to a pressure of fluids within the mud conduit, and be of a type of fluid that lubricates and convectively cools the seal elements participating in forming the first and/or second mechanical face seals. A controlled leakage of buffer fluid across the second mechanical face seal may also be provided to contribute to the cooling function of the buffer fluid, in which case buffer fluid may be replenished. A hydraulic intensifier or pressure regulator may automatically adjust the pressure of the buffer fluid provided in the cavity at 612. A secondary seal may further collect any buffer fluid draining past the second mechanical face seal into an additional cavity for drainage.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A washpipe seal arrangement disposed between a non-rotating machine component and a rotating machine component, and along a fluid conduit extending across the rotating and non-rotating machine components, the washpipe seal arrangement comprising:
   a non-rotating frame connected to the non-rotating machine component, the non-rotating frame including a non-rotating seal carrier, the non-rotating seal carrier having a generally hollow cylindrical shape that forms an internal cavity;
   a first non-rotating seal connected to the non-rotating seal carrier;
   a second non-rotating seal connected to the non-rotating seal carrier, the first and second non-rotating seals disposed in the internal cavity and in spaced relation relative to one another;
   a rotatable seal carrier rotatably disposed at least partially within the internal cavity;
   a first rotating seal connected to the rotatable seal carrier and disposed adjacent the first non-rotating seal;
   a second rotating seal connected to the rotatable seal carrier and disposed adjacent the second non-rotating seal;
   wherein, during operation, the first rotating seal contacts the first non-rotating seal to define a first sliding mechanical seal configured to seal the fluid conduit; and
   wherein, during operation, the second rotating seal contacts the second non-rotating seal to define a second sliding mechanical face seal configured to seal a first portion of the internal cavity that is separate from the fluid conduit and extends to the first sliding mechanical seal,
   further comprising at least one first spring disposed between the non-rotating seal carrier and the first non-rotating seal, wherein the first non-rotating seal is slidably disposed on the non-rotating seal carrier and the at least one first spring biases the first non-rotating seal in a direction towards the first rotating seal;
   further comprising at least one second spring disposed between the rotatable seal carrier and the second rotating seal, wherein the second rotating seal is slidably disposed on the rotatable seal carrier and the at least one second spring biases the second rotating seal in a direction towards the second non-rotating seal.

2. The washpipe seal arrangement of claim 1, further comprising a secondary seal disposed between the non-rotating frame and the rotatable seal carrier, the secondary seal being configured to seal a second portion of the internal cavity that is separate from the fluid conduit and the first portion of the internal cavity, the second portion of the internal cavity extending between the second sliding mechanical face seal and the secondary seal.

3. The washpipe seal arrangement of claim 2, further comprising a drain port in fluid communication with the second portion of the internal cavity.

4. The washpipe seal arrangement of claim 1, further comprising a buffer fluid port in fluid communication with the first portion of the internal cavity, wherein, during operation, fluids in the fluid conduit are adapted to be provided at a first pressure, P1, and a buffer fluid is adapted to be provided in the first portion of the internal cavity at a second pressure, P2, and wherein $P1 \leq P2$.

5. The washpipe seal arrangement of claim 1, further comprising a reducing flow cross section in the fluid conduit disposed at an upstream location with respect to a direction of flow of fluid within the fluid conduit relative to the first sliding mechanical seal.

6. A washpipe seal arrangement for use with a mud conduit in a drilling operation, the mud conduit extending between a topdrive and a drill string, the washpipe seal arrangement comprising:
   a non-rotating frame connected to a non-rotating machine component of the topdrive, the non-rotating frame including a non-rotating seal carrier, the non-rotating seal carrier having a generally hollow cylindrical shape that forms an internal cavity;
   a first non-rotating seal connected to the non-rotating seal carrier, and a second non-rotating seal connected to the non-rotating seal carrier, the first and second non-rotating seals disposed in the internal cavity and in spaced relation relative to one another;
   a rotatable seal carrier rotatably disposed at least partially within the internal cavity;
   a first rotating seal connected to the rotatable seal carrier and disposed adjacent the first non-rotating seal, and a second rotating seal connected to the rotatable seal carrier and disposed adjacent the second non-rotating seal;
   wherein, during operation, the first rotating seal contacts the first non-rotating seal to define a first sliding mechanical seal configured to seal the mud conduit;
   wherein, the second rotating seal contacts the second non-rotating seal to define a second sliding mechanical face seal configured to seal a first portion of the internal cavity that is separate from the mud conduit and extends to the first sliding mechanical seal; and
   wherein a buffer fluid is provided at a pressure that is at least equal or higher than a pressure of mud in the mud conduit, the buffer fluid being provided in the first portion of the internal cavity,
   further comprising at least one first spring disposed between the non-rotating seal carrier and the first non-rotating seal, wherein the first non-rotating seal is slidably disposed on the non-rotating seal carrier and the at least one first spring biases the first non-rotating seal in a direction towards the first rotating seal,
   further comprising at least one second spring disposed between the rotatable seal carrier and the second rotating seal, wherein the second rotating seal is slidably disposed on the rotatable seal carrier and the at least one second spring biases the second rotating seal in a direction towards the second non-rotating seal.

7. The washpipe seal arrangement of claim 6, further comprising a secondary seal disposed between the non-rotating frame and the rotatable seal carrier, the secondary seal being configured to seal a second portion of the internal cavity that is separate from the mud conduit and the first portion of the internal cavity, the second portion of the internal cavity extending between the second sliding mechanical face seal and the secondary seal.

8. The washpipe seal arrangement of claim 7, further comprising a drain port in fluid communication with the second portion of the internal cavity, the drain port configured to permit drainage of the buffer fluid entering the second portion of the internal cavity.

9. The washpipe seal arrangement of claim 6, wherein the second sliding mechanical face seal is configured to permit a controlled leak of buffer fluid from the first portion to the second portion of the internal cavity.

10. The washpipe seal arrangement of claim 9, further comprising a buffer fluid port in fluid communication with the first portion of the internal cavity, and wherein mud in the mud conduit is provided at a first pressure, P1, and the buffer fluid is provided in the first portion of the internal cavity at a second pressure, P2, such that P1≤P2.

11. The washpipe seal arrangement of claim 6, further comprising a reducing flow cross section in the mud conduit disposed at an upstream location with respect to a direction of flow of mud within the mud conduit relative to the first sliding mechanical seal.

12. A washpipe seal arrangement disposed between a non-rotating machine component and a rotating machine component, and along a fluid conduit extending across the rotating and non-rotating machine components, the washpipe seal arrangement comprising:

a non-rotating frame connected to the non-rotating machine component, the non-rotating frame including a non-rotating seal carrier, the non-rotating seal carrier having a generally hollow cylindrical shape that forms an internal cavity;

a first non-rotating seal connected to the non-rotating seal carrier;

a second non-rotating seal connected to the non-rotating seal carrier, the first and second non-rotating seals disposed in the internal cavity and in spaced relation relative to one another;

a rotatable seal carrier rotatably disposed at least partially within the internal cavity;

a first rotating seal connected to the rotatable seal carrier and disposed adjacent the first non-rotating seal; and a second rotating seal connected to the rotatable seal carrier and disposed adjacent the second non-rotating seal;

wherein, during operation, the first rotating seal contacts the first non-rotating seal to define a first sliding mechanical seal configured to seal the fluid conduit;

wherein, during operation, the second rotating seal contacts the second non-rotating seal to define a second sliding mechanical face seal configured to seal a first portion of the internal cavity that is separate from the fluid conduit and extends to the first sliding mechanical seal, and further comprising a buffer fluid port in fluid communication with the first portion of the internal cavity, wherein, during operation, fluids in the fluid conduit are provided at a first pressure, P1, and a buffer fluid is provided in the first portion of the internal cavity at a second pressure, P2, and wherein P1≤P2.

* * * * *